United States Patent [19]

Ahlgren

[11] 4,123,342

[45] Oct. 31, 1978

[54] ULTRAFILTRATION AND ELECTRODIALYSIS METHOD AND APPARATUS

[75] Inventor: Richard M. Ahlgren, Waukesha, Wis.

[73] Assignee: Aqua-Chem, Inc., Milwaukee, Wis.

[21] Appl. No.: 805,121

[22] Filed: Jun. 9, 1977

Related U.S. Application Data

[62] Division of Ser. No. 670,159, Mar. 25, 1976, abandoned.

[51] Int. Cl.² ............................................. B01D 13/02
[52] U.S. Cl. ................................. 204/180 P; 204/301
[58] Field of Search ................... 204/180 P, 299, 301, 204/99

[56] References Cited

U.S. PATENT DOCUMENTS

| | | | |
|---|---|---|---|
| 3,214,362 | 10/1965 | Juda | 204/180 P X |
| 3,309,301 | 3/1967 | Kollsman | 204/180 P |
| 3,577,331 | 5/1971 | Lacey et al. | 204/180 P |
| 3,687,682 | 8/1972 | Scheder | 204/180 P X |
| 3,767,548 | 10/1973 | Okada et al. | 204/180 P |
| 3,870,613 | 3/1975 | Nakamura et al. | 204/180 P |
| 3,905,886 | 9/1975 | Wang | 204/180 P |

*Primary Examiner*—Arthur C. Prescott
*Attorney, Agent, or Firm*—Fred Wiviott

[57] ABSTRACT

A combination electrodialysis method and apparatus comprising ultrafiltration membrane cell pairs interposed between a cation-selective membrane and an ion-nonselective membrane. The solution to be treated is fed to one side of the ultrafiltration membrane cell, a concentrating solution is delivered between the cation-selective and ion-nonselective membranes, and an electric field is applied across the assembly. Cations pass through the ion-selective membrane, ions of both polarities and weakly ionized substances pass through the ultrafiltration membrane which rejects the larger sized particles and molecules and anions pass through the ion-nonselective membrane to maintain electrical balance.

7 Claims, 1 Drawing Figure

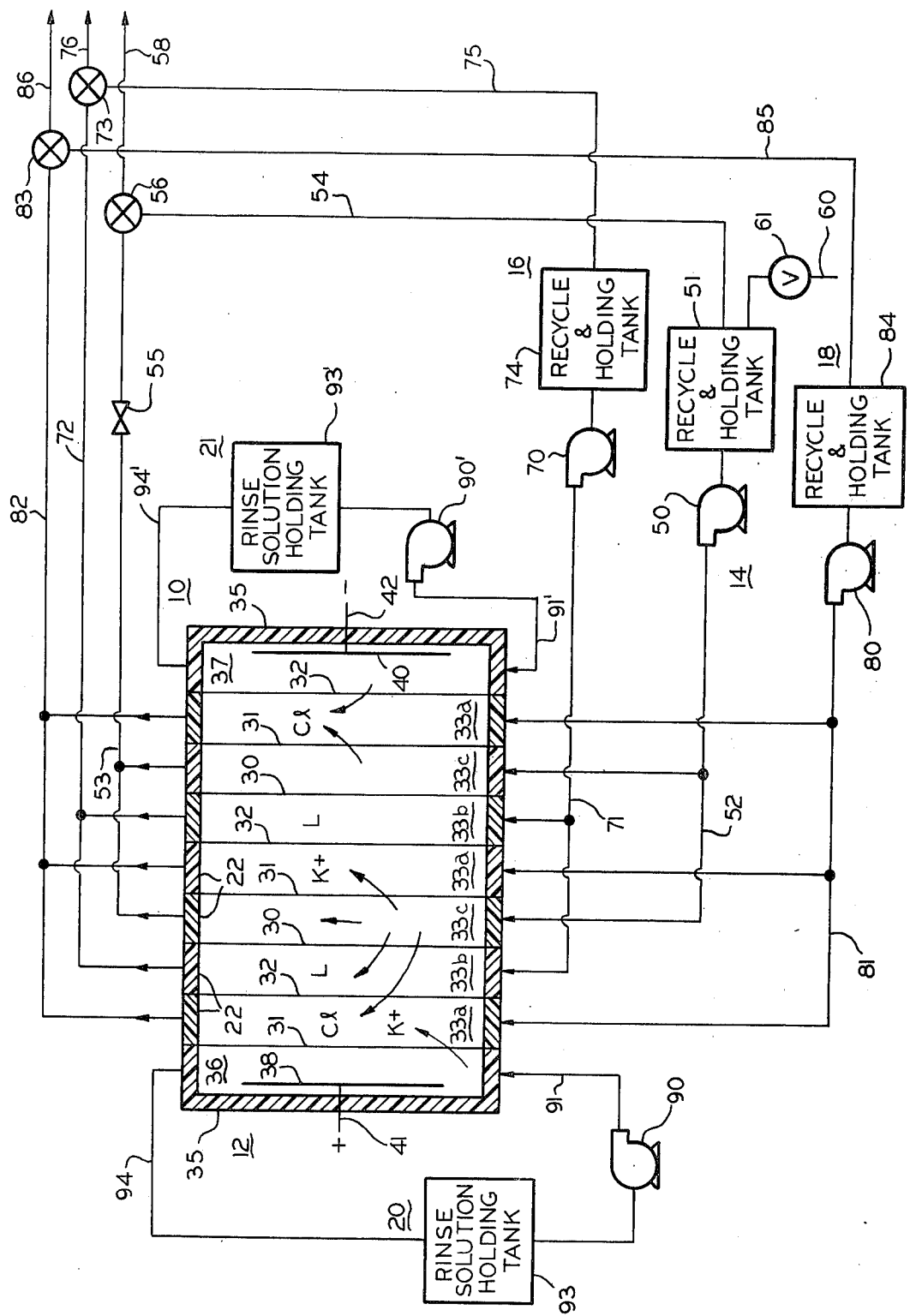

ULTRAFILTRATION AND ELECTRODIALYSIS METHOD AND APPARATUS

This is a division of application Ser. No. 670,159, filed Mar. 25, 1976, now abandoned.

BACKGROUND OF THE INVENTION

This invention relates to fluid separation and permeation.

One method of permeation separation involves electrodialysis wherein the solution to be demineralized is fed into one or more cells defined by ion-selective membranes. When an electric field is applied across the separation cells, negative ions are drawn through anion-permeable membranes toward the cathode, while positive ions are drawn through cation-permeable membranes toward the anode whereby the feed solution is continually deionized.

One prior art type of separation apparatus employs filtration membranes in combination with electrodialysis cells for the removal of relatively large particles in addition to ionic particles. This type of apparatus is effective for separating the constituents of protein solutions such as cheese whey which contains proteins, lactose and minerals, commonly referred to as ash. The protein is separated by the filtration membranes while the anion and cation membranes separate the lactose from the ash which is typically potassium chloride. However, such protein solutions also typically include other anionic materials, such as weakly ionized amino acids, which tend to ineversibly foul anion membranes.

SUMMARY OF THE INVENTION

It is a general object of the present invention to provide a new and improved method and apparatus for separating the constituents of a protein solution.

A more specific object of the present invention is to provide a system for separating the constituents of a protein solution wherein fouling of the ion selective membrances is minimized.

How these and other objects and advantages of the present invention are accomplished will become apparent from the detailed description thereof taken with the accompanying drawing. Generally, however, in a preferred form, the invention includes a permeation separation device comprising a plurality of cells defined by a filtration membrane flanked by pairs of cation-selective and neutral or ion-nonselective membranes.

BRIEF DESCRIPTION OF THE DRAWING

The single FIGURE is a schematic diagram of permeation separation apparatus according to a preferred embodiment of the present invention.

DESCRIPTION OF THE PREFERRED EMBODIMENT

The single FIGURE of the drawing schematically illustrates the permeation separation apparatus 10 according to the present invention to include a cell pack 12, a feed solution injection, protein recirculation and removal system 14, a permeate recirculation and removal system 16, an ash recirculation and removal system 18, an anolyte rinse system 20 and a catholyte rinse system 21. It will be appreciated the apparatus illustrated in the drawing is exemplary and modifications thereof can be made without departing from the scope of the present invention.

Cell pack 12 may be any well known type of membrane assembly such as a plate and frame assembly wherein a plurality of suitably perforated gaskets 22 support and seal the peripheries of a plurality of planar membranes 30, 31 and 32 in parallel spaced relation to form a series of parallel permeation cells 33a, 33b, 33c and end cells 36 and 37. Each permeation cell is defined by two of the membranes and the gaskets and the end cells 36 and 37 are respectively defined by membranes 31 and 32 and end caps 35. Disposed within end cell 36 is a suitable anode 38 and a cathode 40 is disposed in the opposite end cell 37. Anode 38 and cathode 40 are connected respectively to the positive and negative terminals of a suitable power source (not shown) through leads 41 and 42. Enclosure 24 also includes suitable couplings (not shown) for admitting and removing liquids from each of cells 33a, 33b, 33c, 36 and 37. The components of the cell pack 12 are held in an abutting relation by suitable clamps or tie rods (not shown). In addition, the membranes 30 and 31 which define the cells 33c are suitably supported so that they can withstand the pressures commonly employed in filtration systems, e.g., on the order of 10–100 pounds psi or more.

Membranes 30 are filtration membranes, preferably in the ultrafiltration range; membranes 31 are cation-permeable, anion-impermeable membranes; and membranes 32 are neutral or cation and anion permeable membranes. With respect to the ion permeability of ultrafiltration membranes 30, it is essential that membranes 30 be permeable to either positive or negative ions and preferably they are neutral membranes which are permeable to ions of either charge. A wide variety of suitable materials are known to the ultrafiltration and electrodialysis arts which may be used in the present invention. The primary criteria for ultrafiltration membranes 30 are the ion permeability just described and pore size selectively. For each particular application, a membrane is selected which will reject the large molecular weight constituents to be concentrated. The neutral membranes 32 may be of any suitable material, such as cellophane and pass both anions and cations. However, anions tend to flow through membranes 32 in preference to cations as a result of the tendency for the liquid in cell 33a to remain ionically neutral. Membranes 31 and 32 are then selected after considering the water permeability, flow velocities, ionic rejection capabilities and the nature of the ionic constituents to be encountered in a particular job. All of the membranes, of course, must possess sufficient tensile strength to withstand ultrafiltration operating pressures.

A preferred material for use for ultrafiltration membranes 30 are microporous and anisotropic polyvinyl formal membranes on fabric supports. Such membranes and their method of preparation are disclosed in commonly assigned, copending application Ser. No. 178,407, filed Sept. 7, 1971 for "Polyvinyl Acetal Membrane" and a continuation-in-part application thereof, Ser. No. 478,848, filed June 13, 1974, which applications are expressly incorporated by reference herein. Such membranes are especially preferred for use in the present invention because they are capable of withstanding normal operating pressures, and because they can withstand repeated contact with acidic and caustic cleaning solutions, the use of which will be described below.

Suitable materials for use as membranes 31 include cation exchange resins having active ion capture sites. Membranes 31 can be, for example, MC-3142 cation exchange membranes manufactured by Ionac Chemical Sybron Corporation, while membranes 32 can be, for example, reconstituted cellulose, which typically has electrical resistance in the range of 20-30 ohm-cm² for 0.5N NaCl and is ion-nonselective. Properties for membrane 31 are set forth in the following Table I.

TABLE I

| Property | MC-3142 |
|---|---|
| Electrical Resistance (ohm-cm²) | |
| 0.1N NaCl | 9.1 |
| 1.0N NaCl | 3.4 |
| % Permselectivity | |
| 0.5N NaCl/1.0N NaCl | 94.1 |
| 0.2N NaCl/0.1N NaCl | 99.0 |
| Water Permeability | |
| ml/hr/ft²/30 psi | Negligible |
| ml/hr/ft²/10 psi | Negligible |
| Thickness | 6 mils. |
| Capacity | |
| meq/g | 1.06 |
| meq/cm² | 0.021 |
| Dimensional Stability | Good |
| Mullen Burst Strength (PSI) | 185 |

In the illustrated embodiment, membranes 31 and 32 respectively form the membrane walls at end chambers 36 and 37, and proceeding from the left to the right of the FIGURE, the membrane arrangement is 31, 32, 30, 31, 32 ... 32. Between end cells 36 and 37, and again proceeding from left to right in the FIGURE, are repetitive cell groups comprising an ash permeate cell 33a defined by membranes 31 and 32, a filtration permeation cell 33b defined by a membrane 30 and 32, and a filtration concentration cell 33c defined by membranes 30 and 31. The illustrated embodiment shows two such repetitive cell groups but any number may be employed ranging from 1 up to 50 or more. As an example, the membrane sheets may be 35 in. by 12 in. which provide an effective membrane area of 25 in.² per membrane when partially covered by gaskets 22.

Referring now to fluid transport systems 14, 16, 18, 20 and 21, the filtration product injection, recirculation and removal system 14 may include a pump 50 for circulating liquid to be concentrated and demineralized from a tank 51 to each of filtration concentration cells 33c through inlet and outlet manifold pipes 52 and 53 and return pipe 54. A suitable pressure regulator or valve 55 is connected into manifold 53 for adjusting the pressure in ultrafiltration concentration cells 33a. In addition, a three way valve 56 is connected to manifold 53 for selectively returning fluid exiting chamber 33a to tank 51 through pipe 54 for discharging the demineralized, concentrated product through pipe 58. Tank 51 may also be connected by pipe 60 and valve 61 to a source of feed solution (not shown). It will be appreciated that when valve 56 is set to couple pipe manifold 53 to discharge pipe 58 and when valve 61 is set to couple pipe 60 to tank 51, the system is in a continuous mode. On the other hand, when valve 56 is set to couple pipe 53 to pipe 54 and valve 61 closed, the system is in a recirculation mode.

The permeate recirculation and removal system 16 is similar to system 14 and includes a circulating pump 70 for circulating permeate through permeate cells 33b through inlet manifold pipe 71 while permeate is removed from cells 33b by outlet manifold pipe 72. A three-way valve 73 may connect manifold pipe 72 to a holding tank 74 through pipe 75 or to permeate discharge through pipe 76. By a proper setting of valve 73, system 16 can be operated for discharge or recirculation.

Waste or ash recirculation and removal system 18 also includes a pump 80 for recirculating waste liquid to waste concentration cells 33a through inlet manifold pipe 81 while further concentrated waste is removed from these cells by outlet manifold pipes 82. A three-way valve 83 may connect manifold pipe 82 to holding tank 84 by pipe 85 and to waste by pipe 86. Here again, the proper adjustment of valve 83 the system 18 can be set for discharge or recirculation.

The electrode rinse system 20 includes a pump 90, connected by an inlet pipe 91 to one end of cell 36 and to a rinse solution holding tank 93, which in turn is connected by pipe 94 to the other end of cell 37. Rinse system 21 for cell 37 is identical and the same components are identified by the same reference numerals as in system 20 except that they are distinguished by a prime(').

The method of operation of permeation apparatus 10 can be advantageously described in connection with the demineralization and separation of proteins and lactose from cheese whey. For purposes of this description, it will be assumed that the ash content of whey is exclusively $K+Cl-$, it being realized that actually other ionic constituents are present in cheese whey. An electric field is initially applied between electrodes 38 and 40. For example, for the seven cell group of the illustrated embodiment using $3.5 \times 12$ inch membranes, voltages may range between 30-40 volts, at 1.5-3.5 amps, but these values should not be taken as limiting as suitable operating parameters will vary widely depending on the resistance of the entire cell pack 12. Raw whey is then introduced through pipe 60 into ultrafiltration product injection, recirculation and removal system 14 which in turn feeds the raw material by pump 50 into cells 33c at a pressure of 10-100 psi or more. The desired pressure is set by adjustment of pressure regulator 53. In each of cells 33c, chloride ions, lactose and water are forced through filtration membranes 30 into cell 33b. Potassium ions pass through membranes 31 toward cathode 42 into cells 33a. The chloride ions pass through membranes 32 as a result of the tendency to create an ionic balance. As a result, both potassium and chloride ions collect in cells 33a whereby these ions may be removed through manifold 82. Protein is rejected by membranes 30 and is removed through manifold 53 and demineralized permeate containing lactose is withdrawn through manifold 72.

By appropriate adjustment of valves 56, 61, 73 and 83, the system can be run continuously. At the initial stages of the process, it may be desired to recirculate protein concentrate until desired solids and mineral levels are reached. This is accomplished by setting valves 56 and 61 in the recirculation mode. After the desired levels are reached, the entire batch of protein concentrate may be discharged through pipe 58, or valve 56 may be opened slightly to bleed product from the system through pipe 58. If the latter method is selected, total liquid volumes can be maintained in system 14 by adjusting valve 61 to admit corresponding volumes of raw whey. The same procedures may be followed in systems 16 and 18, with demineralized permeate (lactose) and waste concentrate being removed as desired. It is preferred to rinse electrode cells 36 and 37 continously by passing a dilute sulphuric acid solution through the cells using electrode rinse systems 20 and 21. Sodium sulphite may be substituted for the sulphuric acid and a number of additional electrode rinse compositions are known to the electrodialysis art.

It may also be desirable from time to time to thoroughly cleanse the membranes within cell pack 12 using membrane cleaning procedures known to the art. In one such procedure, the entire cell pack is rinsed with water, rinsed with a caustic cleaning solution, rinsed with water, rinsed with an acidic cleaning solution and again rinsed thoroughly with water at intervals which will depend on the types of feed solutions and products encountered. Because cheese whey provides such an excellent base for bacterial growth, it may be necessary to clean apparatus 10 daily when the system is being used for cheese whey separation. The cleaning solution may be introduced through system 14 or otherwise. Another cleaning procedure which is especially valuable for the ultrafiltration membrane cell pair comprises reversing the direction of flow periodically through cells 33 to remove accumulations of proteins at the surfaces of ultrafiltration membrane 30.

Table I shows that the water permeability of membranes 31 and 32 is negligible, and for this reason circulating solutions should be pumped through system 18 to carry ash from cells 33a. Again, suitable solutions can be chosen from those known to the electrodialysis art, one example being a 0.5 to 1.0% sodium chloride solution in distilled water. It is not necessary to employ additional fluids in system 16 as the ultrafiltration membrane is highly water permeable under operating pressures.

While the illustrated embodiment has been described in connection with the demineralization and concentration of cheese whey proteins, the inventive concept is equally applicable to other systems. Paper processing plants produce large volumes of waste mixtures including lignin, sugars and acid. Such plants may employ the process to concentrate and de-acidify lignin in cells 33c, to separate and de-acidify sugars in cells 33b and to concentrate the acidic components in cells 33a. Proper selection of membranes, operating voltages and injection pressures may readily be made after the components of the system are analyzed with respect to their molecular weights, ionic characteristics, etc. Also, while the foregoing description has discussed the use of cation and neutral ion-selective membranes, it is also contemplated that anion and neutral ion-selective membranes could be employed in combination with filtration membranes in an analogous manner.

While the invention has been described in connection with a particular preferred embodiment, the invention can be variously embodied and is to be limited solely by the claims which follow.

I claim:

1. A filtration process comprising:
providing a filtration system including at least one ultrafiltration cell group which is defined by an ultrafiltration membrane disposed between a pair of ion permeable membranes, a first one of which is cation selective and the other of which is at least cation and anion permeable,
applying an electric field across said cell group, the cathode being arranged on the side of said housing said first ion-permeable membrane, and
injecting a fluid to be simultaneously ultrafiltered and deionized under pressure into a first cell of said cell group formed by said ultrafiltration membrane and one of said ion permeable membranes, whereby ionic constitutents of said fluid are drawn out of said first cell in one direction relative to said field and whereby permeate is forced through said ultrafiltration membrane into a second cell of said cell group.

2. The invention set forth in claim 1 wherein said filtration system includes a plurality of said cell groups and wherein said fluid is simultaneously injected into a first one of the cells of each of said cell groups.

3. The invention set forth in claim 2 wherein a first one of said ion permeable membranes is anion-impermeable, cation permeable and the other is anion and cation permeable, and injecting said fluid within said cell defined between said first ion selective membranes and said ultrafiltration membranes.

4. The invention set forth in claim 3 and removing concentrated fluid from said first one of said cells of said cell group after ultrafiltration and deionization thereof and recirculating at least a part of said removed fluid back into said first cells.

5. The invention set forth in claim 4 further including the steps of removing a portion of the concentrated and deionized fluid from the filtration system and simultaneously adding fresh fluid to be ultrafiltered and deionized to maintain the liquid volume in the system substantially constant.

6. The invention set forth in claim 2 wherein said ultrafiltration membranes include anisotropic, microporous, polyvinyl formal membranes.

7. The invention set forth in claim 2 wherein said fluid is cheese whey.